US011128168B2

(12) United States Patent
Chakrabartty et al.

(10) Patent No.: US 11,128,168 B2
(45) Date of Patent: Sep. 21, 2021

(54) METHODS AND APPARATUS FOR WIRELESS POWER DELIVERY AND REMOTE SENSING USING SELF-CAPACITANCES

(71) Applicants: Shantanu Chakrabartty, St. Louis, MO (US); Yarub Alazzawi, St. Louis, MO (US); Kenji Aono, St. Louis, MO (US); Erica L. Scheller, St. Louis, MO (US)

(72) Inventors: Shantanu Chakrabartty, St. Louis, MO (US); Yarub Alazzawi, St. Louis, MO (US); Kenji Aono, St. Louis, MO (US); Erica L. Scheller, St. Louis, MO (US)

(73) Assignee: Washington University, St. Louis, MO (US)

( * ) Notice: Subject to any disclaimer, the term of this patent is extended or adjusted under 35 U.S.C. 154(b) by 0 days.

(21) Appl. No.: 16/789,007

(22) Filed: Feb. 12, 2020

(65) Prior Publication Data

US 2020/0259365 A1 Aug. 13, 2020

Related U.S. Application Data

(60) Provisional application No. 62/804,470, filed on Feb. 12, 2019.

(51) Int. Cl.
*H02J 50/05* (2016.01)
*H04B 5/00* (2006.01)

(52) U.S. Cl.
CPC .......... *H02J 50/05* (2016.02); *H04B 5/0012* (2013.01); *H04B 5/0037* (2013.01)

(58) Field of Classification Search
CPC ...... H02J 50/05; H04B 5/0012; H04B 5/0037
USPC ........................................................ 307/104
See application file for complete search history.

(56) References Cited

U.S. PATENT DOCUMENTS

2013/0106770 A1* 5/2013 Bakken ............... G06F 3/03545
345/174
2017/0126282 A1 5/2017 Fromm et al.

FOREIGN PATENT DOCUMENTS

| CA | 2710717 C | 1/2011 |
| JP | H11225119 A | 8/1999 |
| WO | 2011072682 A1 | 6/2011 |

OTHER PUBLICATIONS

Kang et al., "Review of Capacitive Coupling Human Body Commumnications Based on Digital Transmissions," Science Direct, ICT Express 2(4): 180-187 (2016).

* cited by examiner

*Primary Examiner* — Hal Kaplan
(74) *Attorney, Agent, or Firm* — Armstrong Teasdale LLP

(57) ABSTRACT

A self-capacitance based remote power delivery device includes a modulating power source electrically coupled to a grounded substrate, an energy harvesting device coupled to the grounded substrate, and the substrate. The modulating power source is configured to be capacitively coupled to a self-capacitive body. The energy harvesting device configured to be capacitively coupled to the self-capacitive body, and the substrate is configured to be capacitively coupled to a portion of the self-capacitive body in direct contact with the substrate.

3 Claims, 16 Drawing Sheets

METHODS AND APPARATUS FOR WIRELESS POWER DELIVERY AND REMOTE SENSING USING SELF-CAPACITANCES

CROSS-REFERENCE TO RELATED APPLICATION

This application claims priority to U.S. Provisional Patent Application No. 62/804,470 filed Feb. 12, 2019, the entire disclosure of which is hereby incorporated by reference in its entirety.

STATEMENT REGARDING FEDERALLY SPONSORED RESEARCH & DEVELOPMENT

This invention was made with government support under DE027098 awarded by the National Institutes of Health. The government has certain rights in the invention.

FIELD

The present disclosure generally relates to a wireless power transfer system.

BACKGROUND

Electronic devices, including hand-held, implantable, and wearable electronic devices require an energy source in order to function. Supplying power to such devices is an important issue, particularly with implantable and wearable electronic devices. Many such devices currently rely on batteries for power, but batteries may have a relatively low mechanical stability.

Some electronic devices rely on wireless energy delivery (also referred to as wireless power transfer or WPT) for power. Known WPT techniques include radio-frequency (RF) based, optical-based, bio-cell-based, and ultrasound-based wireless energy harvesting. In at least some known RF-based systems, most of the energy from the energy source is radiated to the air, there may be interference with external RF devices, and the antenna size may need to be relatively large to utilize lower frequencies. Known optical-based systems often use high optical power (e.g., 100 s mW), do not work in the dark, and require proper orientation to light to deliver sufficient power. Ultrasound-based systems may suffer from decay in signal that increases exponentially with distance and frequency, require a transducer in contact with the medium to deliver power inside the medium, and may interfere with nearby ultrasound devices.

Thus, there is a need for improved wireless power transfer systems that overcome at least some of the above issues with known WPT systems.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of this disclosure is a self-capacitance based remote power delivery device. The device includes a modulating power source electrically coupled to a grounded substrate, an energy harvesting device coupled to the grounded substrate, and the substrate. The modulating power source is configured to be capacitively coupled to a self-capacitive body. The energy harvesting device configured to be capacitively coupled to the self-capacitive body, and the substrate is configured to be capacitively coupled to a portion of the self-capacitive body in direct contact with the substrate.

Another aspect is a self-capacitance based method of remotely delivering power. The method includes coupling a modulating power source and an energy harvesting device to a grounded substrate, capacitively coupling the modulating power source and the energy harvesting device to a self-capacitive body, capacitively coupling the grounded substrate to a portion of the self-capacitive body in contact with the grounded substrate, and operating the modulating power source at an operating frequency to deliver power to the energy harvesting device via the self-capacitive body.

Another aspect of the disclosure is a self-capacitance based biotelemetry system. The system includes a grounded substrate including an insulating layer and a conductive layer, wherein the conductive layer is coupled to a power source, and the grounded substrate is configured to be capacitively coupled to a portion of a self-capacitive body in contact with the grounded substrate. The system also includes a transmitter antenna, a receiver antenna, and a biotelemetry interface device capacitively coupled to the self-capacitive body. The biotelemetry interface device includes a low-power oscillator, a radio frequency antenna, a resistor, a rectifying diode bridge, and a floating electrode coupled to a reference terminal.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Like reference symbols in the various drawings indicate like elements.

DETAILED DESCRIPTION

Example systems and methods for wireless power transfer (WPT) based on self-capacitance (SC-based WPT) are described herein. The SC-based WPT systems and techniques may be used to provide power to implanted devices and sensors, such as temperature sensors, neural sensors, oral cavity sensors, heart monitors, and the like. The systems and techniques may also be used to power wearable devices, such as smart watches, activity/fitness/performance monitors, smart shoes, smart glasses, insulin pumps, and the like.

The methods and systems are sometime described below with respect to mice and mouse cadavers. It should be understood that the systems and methods may be applied to humans (and on a human scale) as well.

Figure 1A:
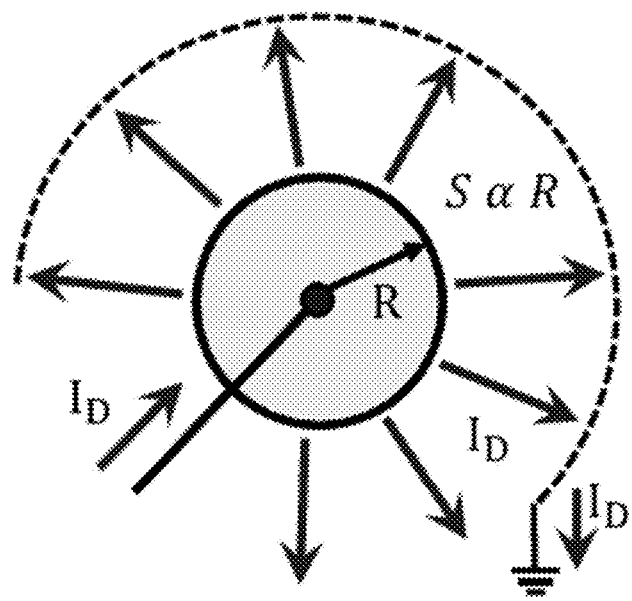
FIG. 1A is an illustration of self-capacitance serving as a return path for displacement currents emanating from a power-source through the external ground back to the source using an electrically isolated sphere.

Self-capacitance is an intrinsic property of any electrically isolated body which arises because there always exists fringe electrostatic fields between the body and a theoretical but omni-present, infinitely-large ground plane. In practice, self-capacitances manifest themselves as parasitic elements that either serve as a nuisance during system design or could be exploited for sensing applications. However, self-capacitances can also serve as a return path for displacement currents emanating from a power-source through the external ground back to the source, as illustrated in FIG. 1A using an electrically isolated sphere.

Figure 1B:
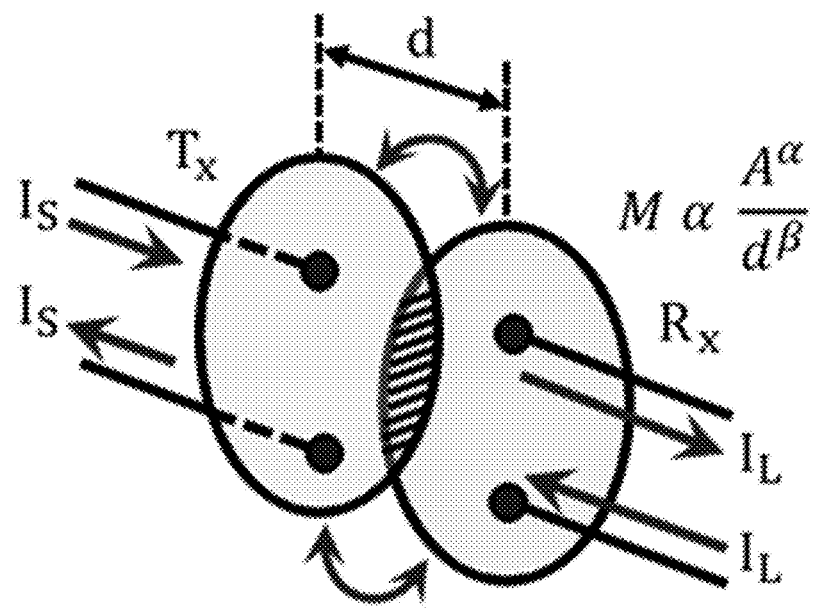
FIG. 1B is an illustration of a conventional wireless power-delivery technique relying on the mutual coupling between the source and receiver transducers.

Since the path traversed by the displacement currents could be long, this attribute has been exploited for designing communication links in wireless body-area-network (WBAN). Conventional wireless power-delivery techniques rely on the mutual coupling between the source and receiver transducers, as illustrated in FIG. 1B, and therefore the system power-transfer efficiency (PTE) is determined by the cross-sectional area, the relative alignment and the distance between the transducers. As shown in FIG. 1B, the return path for the source transducer current (Is) is separated from the return path of the load transducer current (IL), as a result, the source dissipates a fixed amount of power and only a fraction of the source power gets coupled to the load. In the case of self-capacitance, the return path for the source current only exists through the load and through the parasitic elements, which may lead to a high power-transfer efficiency (PTE). Also, because self-capacitances scale linearly with dimensions, the maximum received power also scales linearly with the receiver form-factor. This is in comparison to inductive WPT approach, where PTE scales as a cube of the source/receiver coil dimensions. For ultrasound-based and other far-field WPT approaches, the transfer-efficiency scales as the square of the transducer dimensions. Specifically, for power-budgets less than 10 µW, SC-based WPT offers significant advantages compared to other WPT methods, in terms of powering distances, transducer form-factor and system scalability. Additionally, the SC-based approach is robust to transducer alignment artifacts, which presents a significant challenge for other WPT modalities.

Aspects of the disclosure include a self-capacitance based simple and tractable wireless power-delivery method that can be used for system optimization and comparison with other WPT methods. Compared to previously reported methods, the self-capacitance based approach is analytic and can be applied to complex geometries and substrates. Also disclosed is a hybrid telemetry system based on RF backscattering that is energized using self-capacitance based wireless power transfer.

Self-Capacitance Based Power-Transfer Method

A self-capacitance power delivery method is described below. Before presenting a more general SC-based WPT method that could be applied to complex geometries and substrates, a simple combined-parameter method that can be used for optimization and for comparison with other WPT techniques is presented. The method, as shown in FIG.

2A-2C, uses a homogeneous sphere of diameter d as a transmission substrate or as a wave-guide. In each of these cases, the objective is to transfer power from the source connected at one end of the substrate, to the load resistance RL connected to the other end of the substrate. The power-transfer efficiency (PTE) η that has been used for comparison is defined according to Eqn. 1:

$$\eta = \frac{P_r}{P_s} \quad (1)$$

where Pr is the power dissipated at the resistor RL and Ps is power dissipated at the source.

Figure 2A:
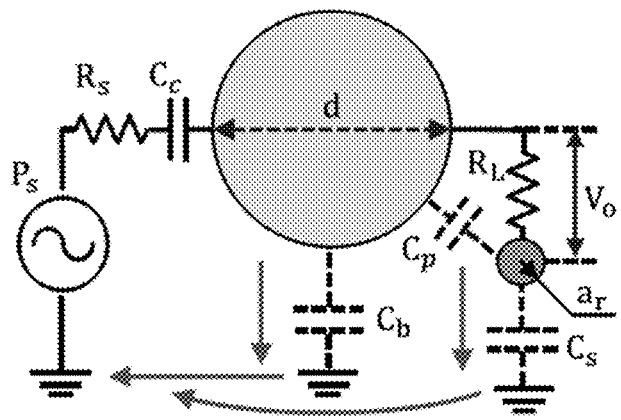
FIG. 2A is a diagram of a system for wireless power transfer based on self-capacitance.

In the SC-based WPT method, as shown in FIG. 2A, the self-capacitance of the substrate is Cb. The coupling capacitance Cc and the resistance Rs represent the interface between the power-source to the load RL. As shown in FIG. 2A, the respective displacement currents flow-back to the power source through Cb and through the self-capacitance of the load, represented by a sphere of radius ar. If d>>ar, then the self-capacitance of the load Cs can be approximated as shown in Eqn. 2:

$$C_s = 4\pi\epsilon a_r \sum_{n=1}^{\infty} \frac{\sinh(\ln(D + \sqrt{(D^2 - 1)}))}{\sinh(n \ln(D + \sqrt{(D^2 - 1)}))} \geq 4\pi\epsilon a_r \quad (2)$$

In Eqn. 2, the $\epsilon$ is the dielectric constant of the medium and D=(d/ar) where d is the distance between the load and the substrate. Irrespective of the magnitude of the ratio D, the self-capacitance Cs can be lower-bounded, as shown in Eqn. 1, which represents the worst-case self-capacitance. This simpler, worst-case expression is used to estimate the minimum power that can be delivered to RL.

Applying standard circuit analysis technique to FIG. 2A, the efficiency of power transfer is shown in Eqn. 3, as derived as shown in Example 1:

$$\eta = \frac{1}{1 + R_L R_s (4\pi^2 \epsilon_0 fd)^2 + \frac{R_s}{R_L}\left(1 + \frac{d}{2a_r}\right)^2} \quad (3)$$

FIGS. 3A-3H plot the efficiency (η) and received power (Pr) for different values of RL, Rs, ar, d and f. Results show that η and Pr vary monotonically with respect to Rs, ar, d and f, except for the load resistance RL. Thus, the expression in Eqn. 3 can be maximized with respect to RL, in which case the maximum power transfer efficiency ηmax is obtained as shown in Eqn. 4:

$$\eta_{max} = \frac{1}{1 + 8\pi^2 \epsilon_0 f R_s \left(a_r + d + \frac{d^2}{2a_r}\right)} \quad (4)$$

The maximum efficiency is achieved for the condition $$R_L = \frac{1}{C_s \omega}$$

and the corresponding power dissipated by the load $R_L$ is given by Eqn. 5:

$$P_{r,max} = \frac{C_s \omega V_s^2}{2\left(\frac{C_c + C_b}{C_c}\right)^2} = \frac{4\pi\epsilon_0 f a_r V_s^2}{\left(1 + \frac{2\pi\epsilon_0 d}{C_c}\right)^2} \quad (5)$$

In Eqn. 5, it is assumed Rs=0 since Pr is monotonic with respect to Rs.

Figure 2B:
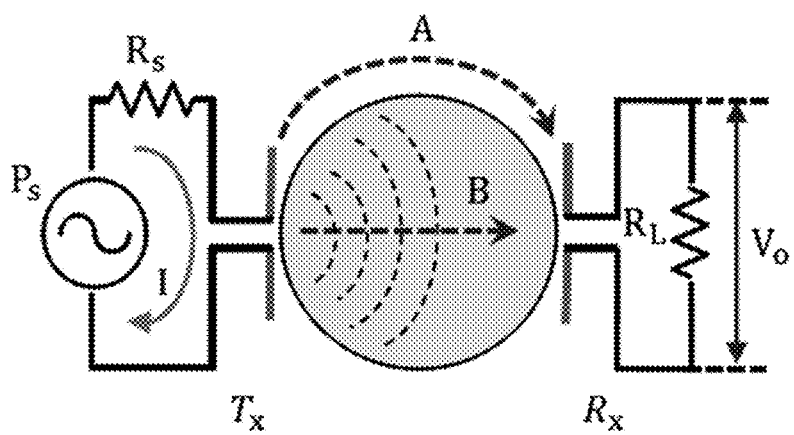
FIG. 2B is a diagram of a system for wireless power transfer based on near and far field radio frequency coupling.
Figure 2C:
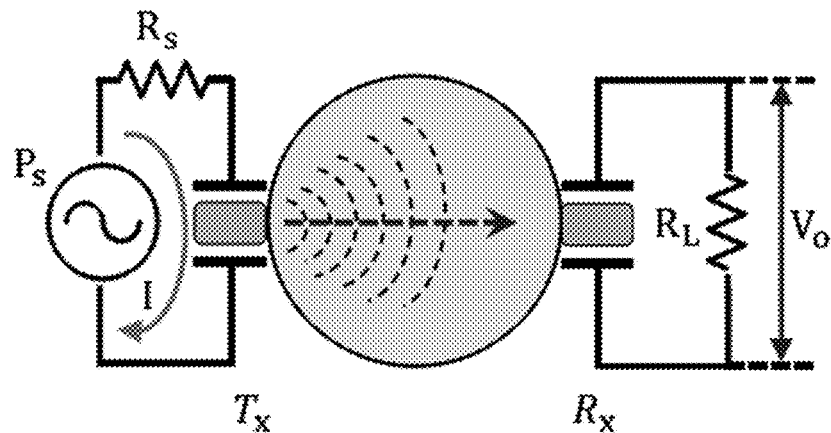
FIG. 2C is a diagram of a system for wireless power transfer based on ultrasonic/acoustic coupling.
Figure 3A:
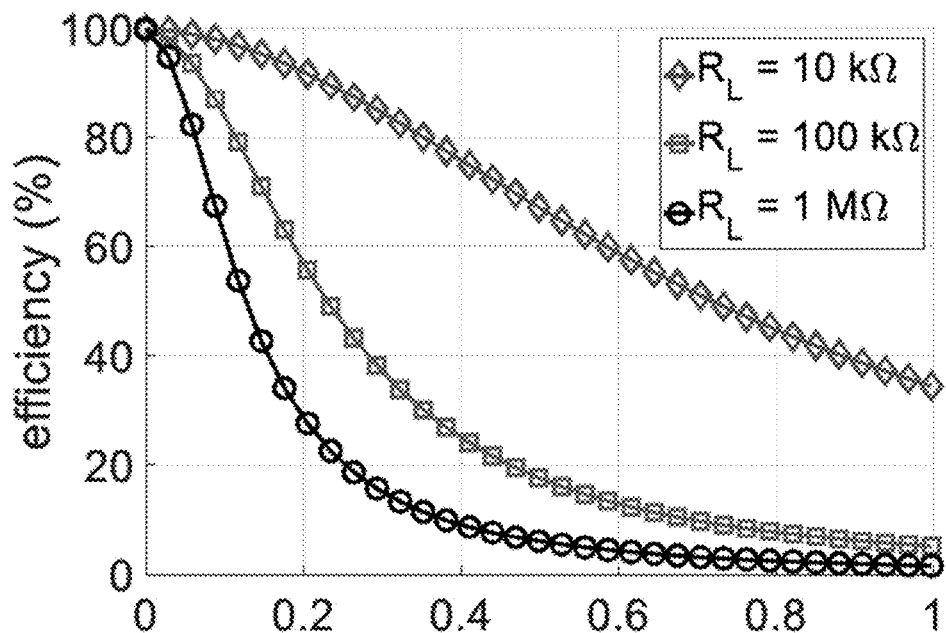
FIG. 3A is a graph of estimated power transfer efficiencies for the system in FIG. 2A when the frequency is 10 MHZ, form factor $a_r$ is 10 mm, and source resistance $R_s$ is 5Ω.
Figure 3B:
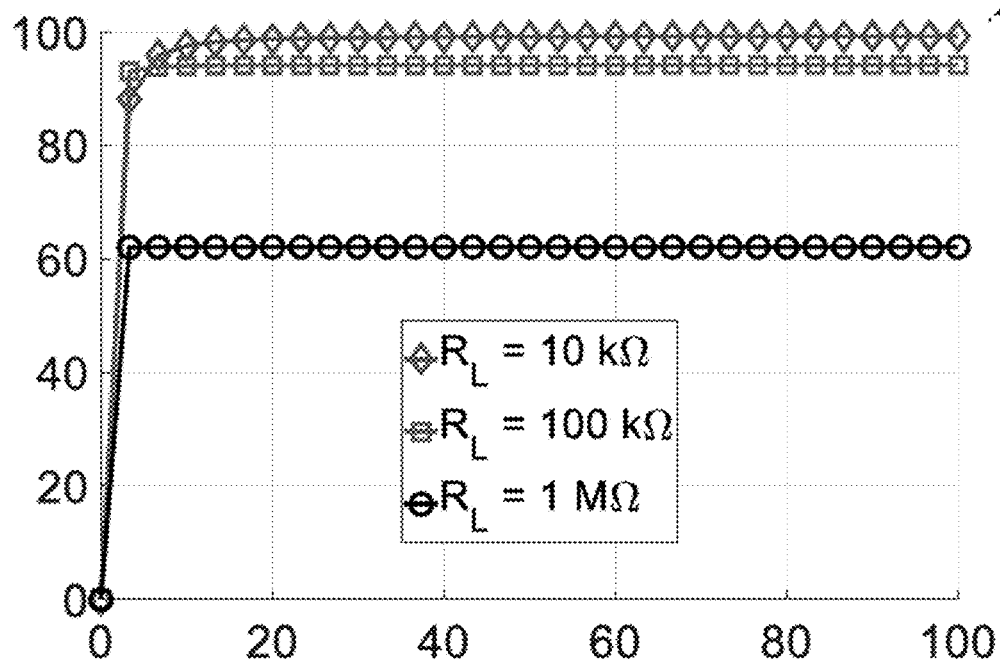
FIG. 3B is a graph of estimated power transfer efficiencies for the system in FIG. 2A when the frequency is 10 MHZ, delivery distance d is 0.1 m, and $R_s$ is 5Ω.
Figure 3C:
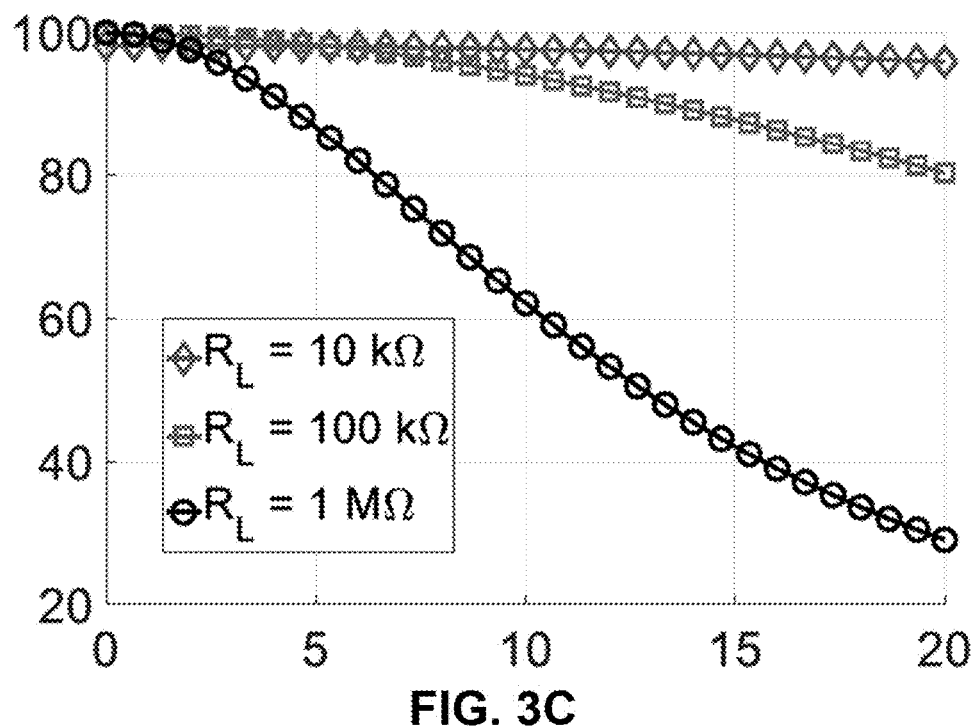
FIG. 3C is a graph of estimated power transfer efficiencies for the system in FIG. 2A when the d is 0.1 m, $a_r$ is 10 mm, and $R_s$ is 5Ω.
Figure 3D:
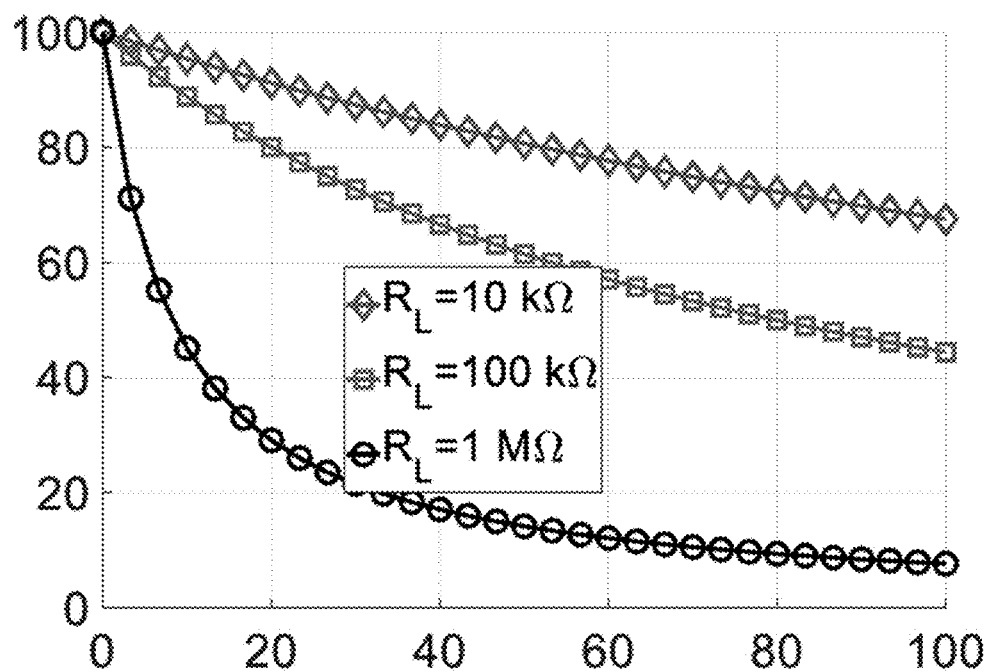
FIG. 3D is a graph of estimated power transfer efficiencies for the system in FIG. 2A when the frequency is 10 MHZ, $a_r$ is 10 mm, and d is 0.1 m.
Figure 3E:
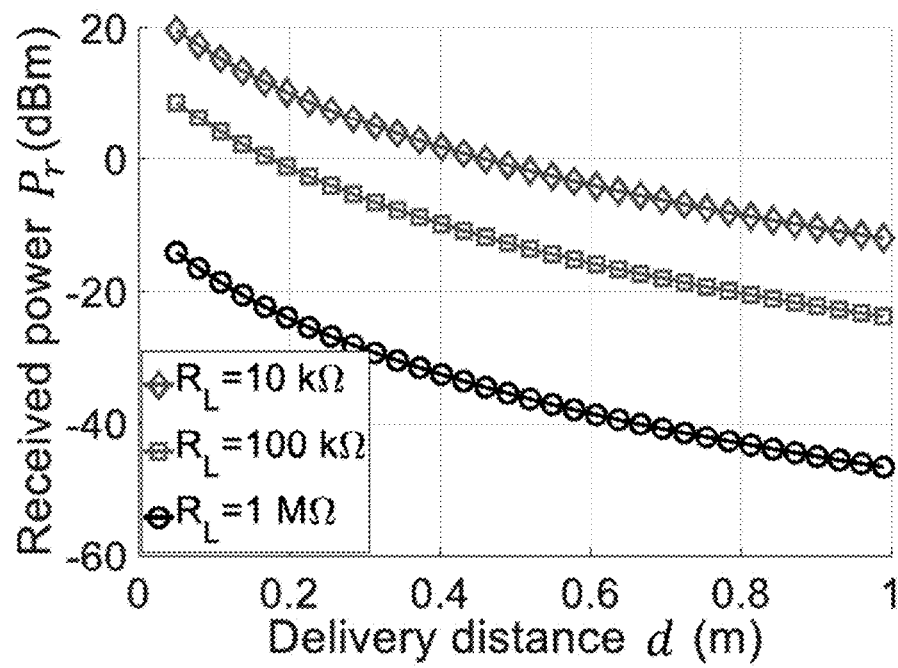
FIG. 3E is a graph of estimated received power $P_r$ for the system in FIG. 2A when the frequency is 10 MHZ, $a_r$ is 10 mm, and $R_s$ is 5Ω.
Figure 3F:
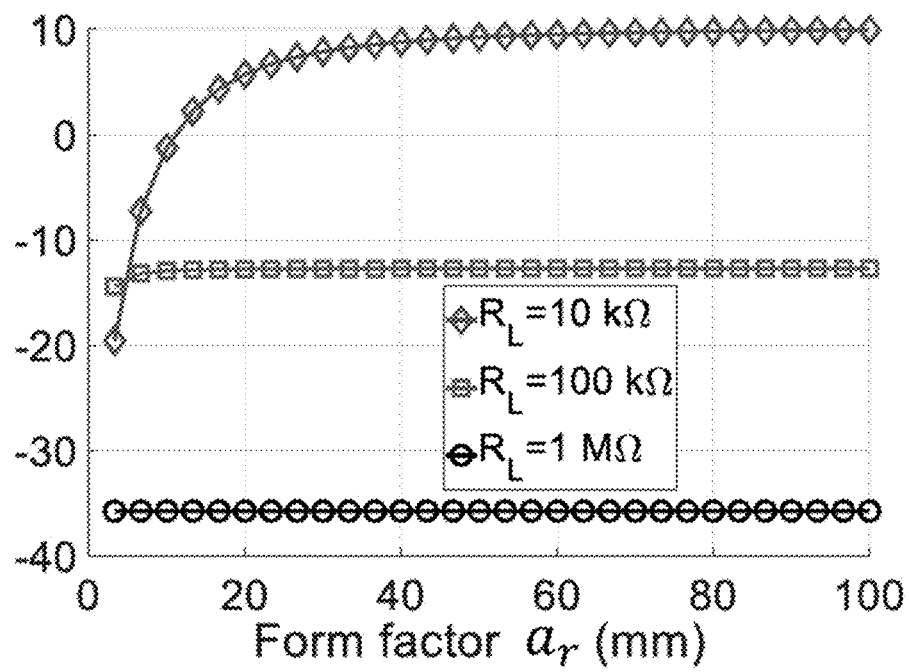
FIG. 3F is a graph of estimated $P_r$ for the system in FIG. 2A when the frequency is 10 MHZ, d is 0.1 m, and $R_s$ is 5Ω.
Figure 3G:
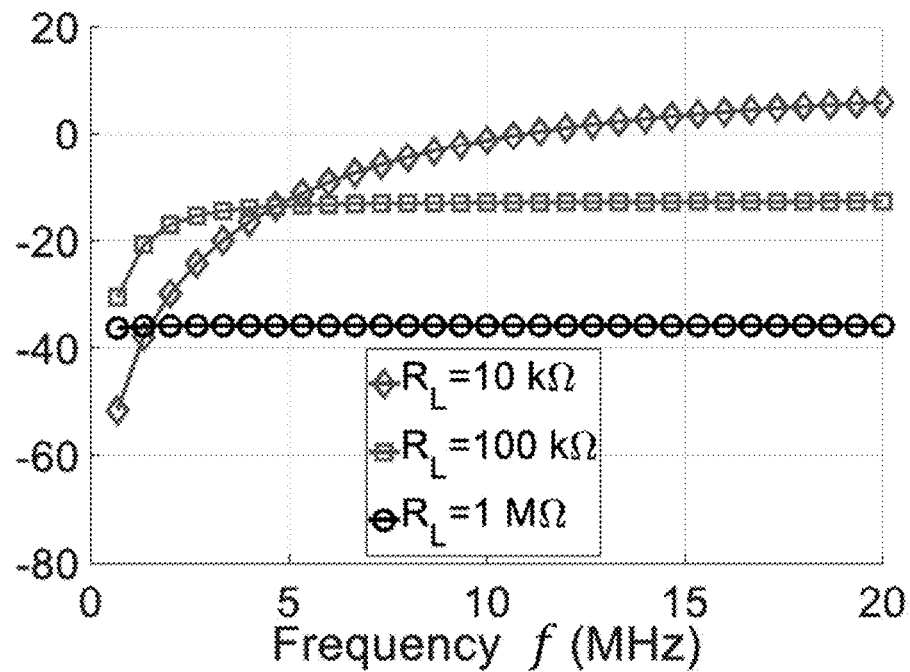
FIG. 3G is a graph of estimated $P_r$ for the system in FIG. 2A when the d is 0.1 m, $a_r$ is 10 mm, and $R_s$ is 5Ω.
Figure 3H:
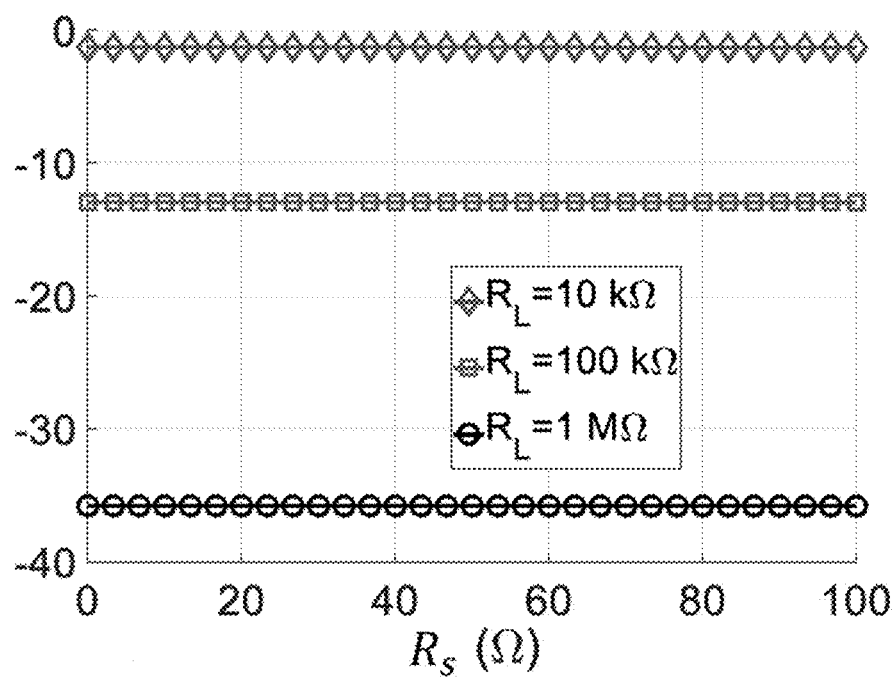
FIG. 3H is a graph of estimated $P_r$ for the system in FIG. 2A when the frequency is 10 MHZ, $a_r$ is 10 mm, and d is 0.1 m.
Figure 4:
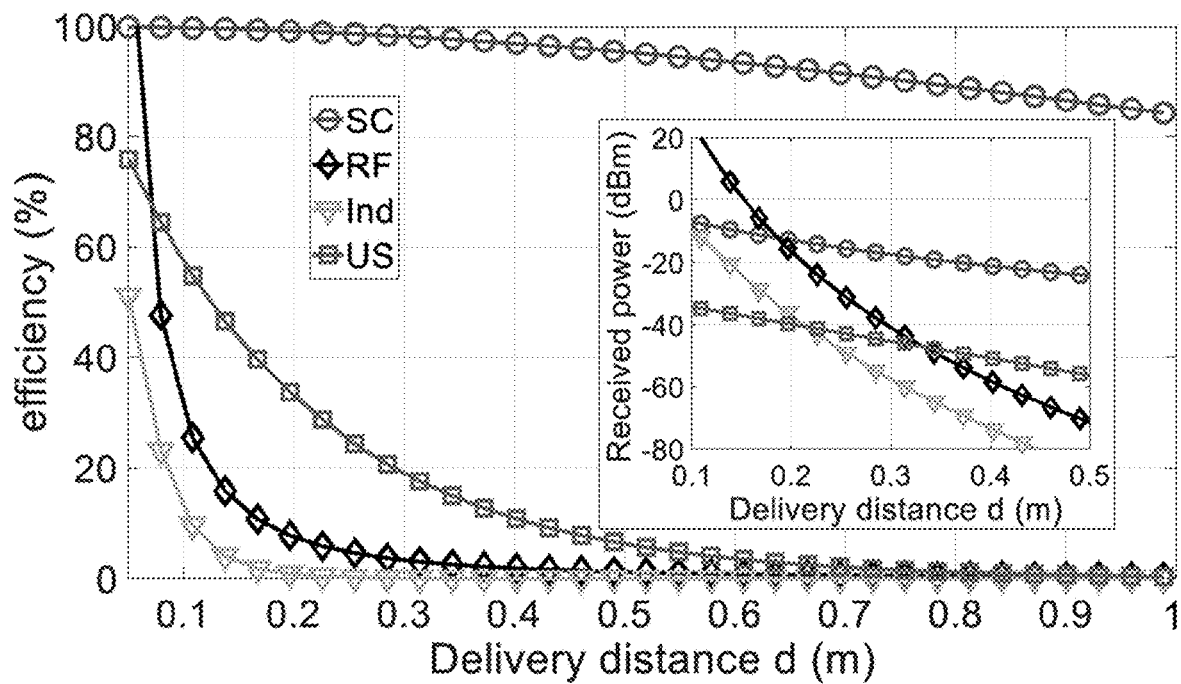
FIG. 4 is a graph comparing power transfer efficiency and received power $P_r$ for different wireless power transfer methods when the receiver transducer dimension is $a_r$=10 mm, f=5 MHz and $R_s$=5Ω.
Figure 5:
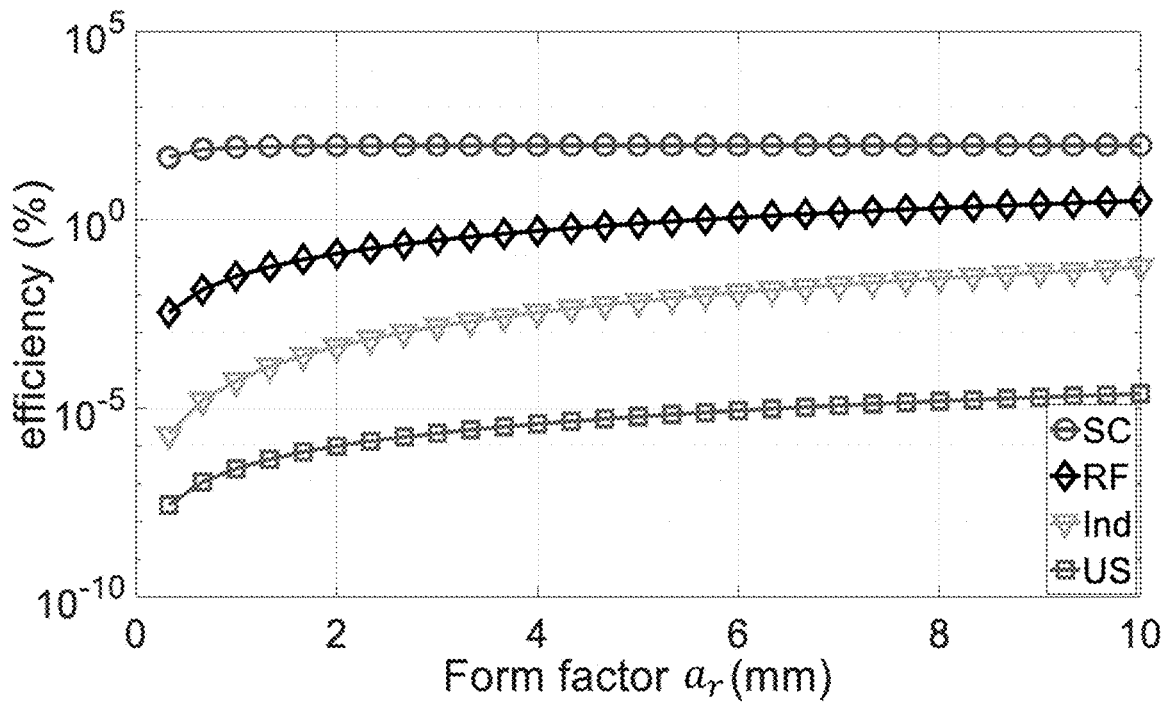
FIG. 5 is a graph comparing power transfer efficiency and received power $P_r$ for different wireless power transfer methods when the transmission distance n is d=0.1 m, f=5 MHz and $R_s$=5Ω.

The expressions in Eqns. 4 and 5 are used for comparing the PTE of the SC-based method with other WPT approaches, as summarized in FIGS. 4 and 5. In the case of RF-based WPT, as shown in FIG. 2B, the energy is delivered over the air, rather than through the substrate, where as in the case of inductive and ultrasound based WPT the power is delivered through the medium, as shown in FIGS. 2B and 2C. The expressions for the power transfer efficiency η for each of the WPT approaches (Ind: inductive, RF: far-field radiofrequency and US: ultrasound) are given by Eqn. 6:

$$\eta = \begin{cases} Q_r Q_t \eta_r \eta_t \dfrac{a_r^3 a_t^3 \pi^2}{(d^2 + a_t^2)^3} & Ind \\[6pt] \dfrac{G_r G_t}{4}\left(\dfrac{2a_r}{\pi d}\right)^2 & RF \\[6pt] \dfrac{a_r^2}{a_t^2} e^{-2\alpha f^\beta d} & US, \end{cases} \quad (6)$$

where $Q_t$=Quality factor of the transmitter coil, $Q_r$=Quality factor of the receiver coil.

$\eta_t$=efficiency of the transmitter coil.

$\eta_r$=efficiency of the receiver coil.

$a_t$=radius of the transmitter $a_r$=radius of the receiver.

d=Distance between transmitter and receiver, $G_t$=Gain of transmitter antenna.

$G_r$=Gain of receiver antenna.

f=frequency of US wave (Hz)

α=Attenuation Parameter (neper/mMHz$^{-\beta}$)

β=<Attenuation Coefficient.

Representative parameter values are summarized in Table I below. FIG. 4 shows that as the transmission distance increases, the SC-based WPT demonstrates a superior PTE compared to the other WPT techniques. In this comparison, the diameter of the receiver transducer (coil or antenna size) was chosen to be ar=10 mm. In FIG. 5, the PTEs for different WPT approaches as the transducer form-factor is varied while keeping the delivery distance constant at d=0.1 m are compared. The results show SC-based WPT demonstrates a superior PTE compared to other approaches. Note that for the other WPT approaches, the transfer frequency needs to be adjusted to ensure ideal impedance matching between the antenna/transducer to the substrate. SC-based WPT is broadband in nature (as verified in experimental results shown below), and therefore does not require any frequency adjustment when the transducer size or alignment changes.

TABLE I

PARAMETERS USED FOR COMPARING
DIFFERENT WPT METHODS [17].

| Property | Description | Value |
| --- | --- | --- |
| $C_c$ | Source coupling capacitance | 10 pF |
| α | Attenuation parameter | 0.086 (neper/mMHz$^{-β}$) |
| β | Attenuation Coefficient | 1.5 |
| $G_t$ | Gain of Tx antenna | 7.5 dB |
| $G_r$ | Gain of Rx antenna | 7.5 dB |

Figure 6A:
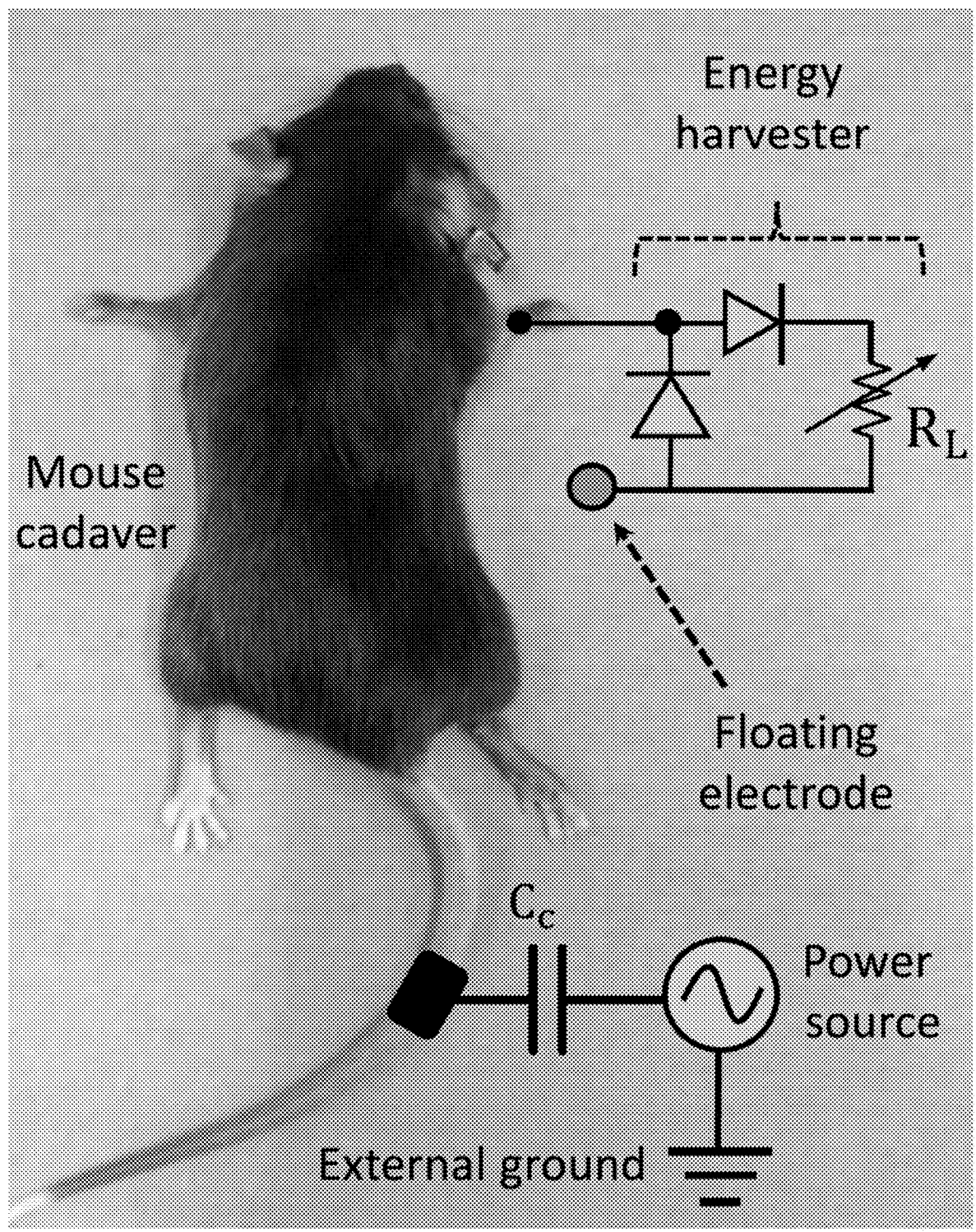
FIG. 6A is an experimental setup for self-capacitance based wireless power transfer using a mouse cadaver.

Using the self-capacitance based method, the framework may extend to substrates with arbitrary shapes and comprised of heterogeneous materials. The method is illustrated here using a mouse model as a substrate and is shown in FIG. 6A. The method can be extended to other animal models as well. As shown in FIG. 6A, the power source is capacitively coupled (through capacitance $C_c$) to the tail of the mouse and the energy harvester is connected to one of the fore-limbs. The harvester in this example comprises of a rectifying diode bridge which drives the load resistance $R_L$ and the reference terminal is connected to a floating-electrode.

Figure 6B:
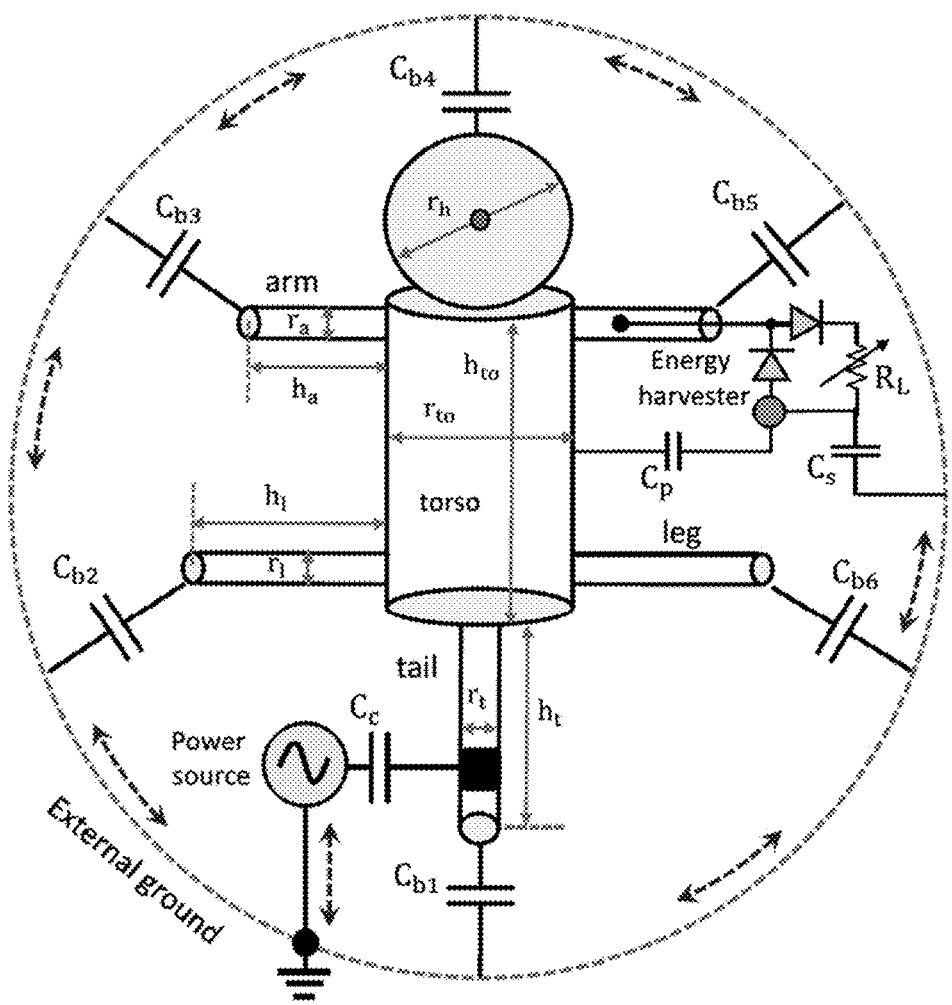
FIG. 6B is an approximation of self-capacitance for the setup in FIG. 6A.
Figure 6C:
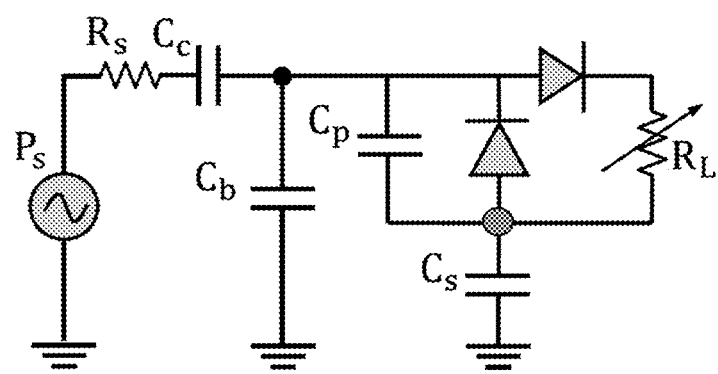
FIG. 6C is a lumped parameter equivalent circuit for the setup in FIG. 6A.

The self-capacitance of the mouse body is estimated by first segmenting different regions of the substrate and approximating each region using a simple shape, for example a sphere or a cylinder, as shown in FIG. 6B. The closed-form expressions for self-capacitances in each of these simple 3-dimensional shapes are well documented and can be estimated as a function of their respective dimensions. For example, the self-capacitance of a cylindrical shape is estimated as $C_{cylinder}=2\pi\epsilon h/\ln(r_2/r_1)$ where h is the length of cylinder, $r_1$ and $r_2$ are the inner and outer radii of the cylinder and $\epsilon$ is the permittivity of the substrate. Similarly, for a spherical shape (modeling the head), the self-capacitance is given by $C_{spherical}=4\pi\epsilon r_1$. With respect to the energy-harvester, each of the self-capacitances ($C_{b1}$, $C_{b2}$, $C_{b3}$, $C_{b4}$, $C_{b5}$ and $C_{b6}$) can be considered to be in parallel to each other (independent path for displacement currents to flow-back to the source). If the capacitive cross-coupling between these different shapes is ignored, all of the elements could be combined together into a single capacitance $C_b$ to form the equivalent circuit shown in FIG. 6C. FIG. 6C also shows a cross-coupling capacitance between the floating-electrode and the body self-capacitance. In some instances, if the size of the floating-electrode is small, the coupling capacitance may be ignored. The equivalent circuit in FIG. 6C also shows a combined resistance $R_s$ that models the resistivity between the coupling electrode and the harvester. In its exact form, $R_s$ and $C_b$ would include distributed elements, but as shown in experimental results, $R_s \approx 0$, leading to the combined equivalent circuit shown in FIG. 6C.

Characterization of SC-Based Power Delivery

Figure 7B:
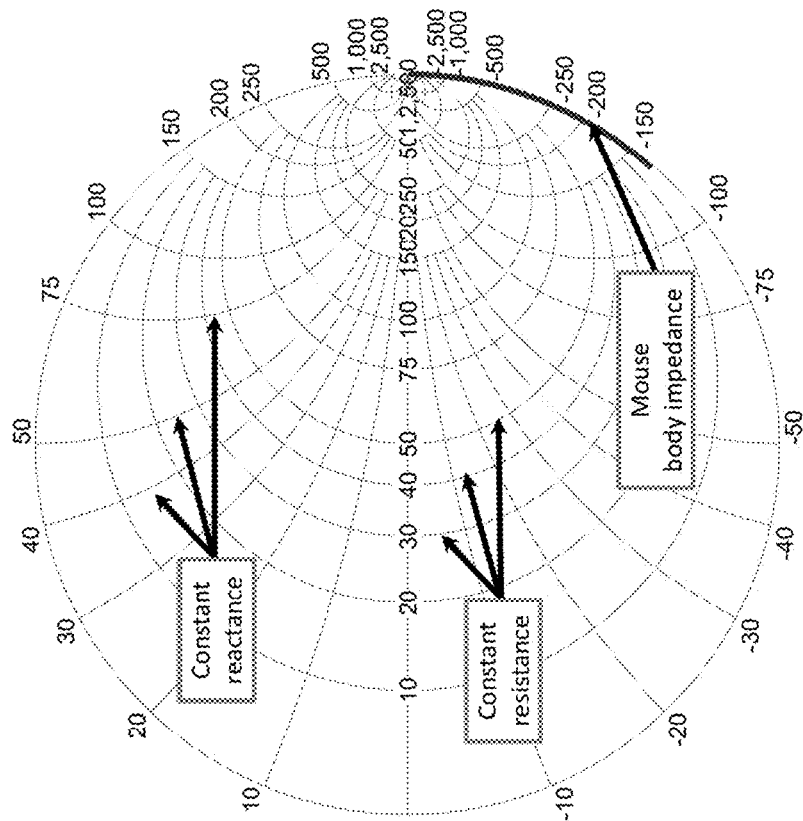
FIG. 7B is a measured Smith-chart demonstrating that the substrate in FIG. 7A is predominately capacitive.
Figure 7A:
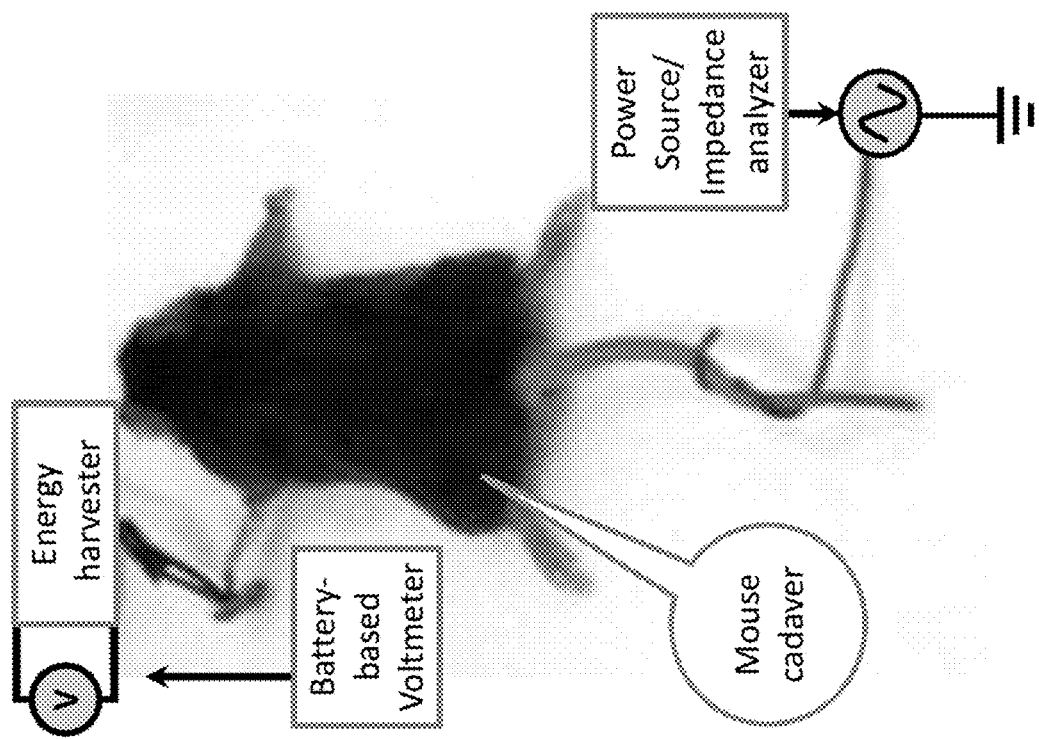
FIG. 7A is an experimental setup for self-capacitance based wireless power transfer using a mouse cadaver.

In a set of experiments, a mouse cadaver model was used to characterize an SC-based power delivery. The experimental setup is shown in FIG. 7A where the cadaver is kept electrically insulated from environmental factors to ensure a capacitive coupling between the body and return path (external ground in this case). The material and methods for storing and reviving the cadaver in this experiment is described in Example 2. First, an impedance analyzer (Omics Bode 100 vector network analyzer) was used to measure the equivalent impedance between the source and the harvester. The resulting Smith-chart corresponding to the frequency of 10 MHz is shown in FIG. 7B which shows that the substrate impedance is predominantly capacitive. This is true even when a resistive load is connected to the energy-harvester, as the body self-capacitance is much larger than the self-capacitance of the floating-electrode. Next, a modulating energy source (an earth-grounded Tektronix DG4102 function generator) is capacitively coupled to the tail of the cadaver. The power source is programmed to generate a sinusoidal wave at a potential of 20 $V_{pk-pk}$ and at variable frequencies. The harvester comprised of a single-stage diode bridge shown in FIG. 7A constructed using two Schottky diodes. The output of the diode bridge was measured using a battery-powered voltmeter with no direct conductive path to ground. Also, connected to the diode-bridge is a load resistor whose magnitude could be varied. Note that the other end of the diode bridge forms the floating-electrode providing a return path for the load-current to the source.

Figure 7C:
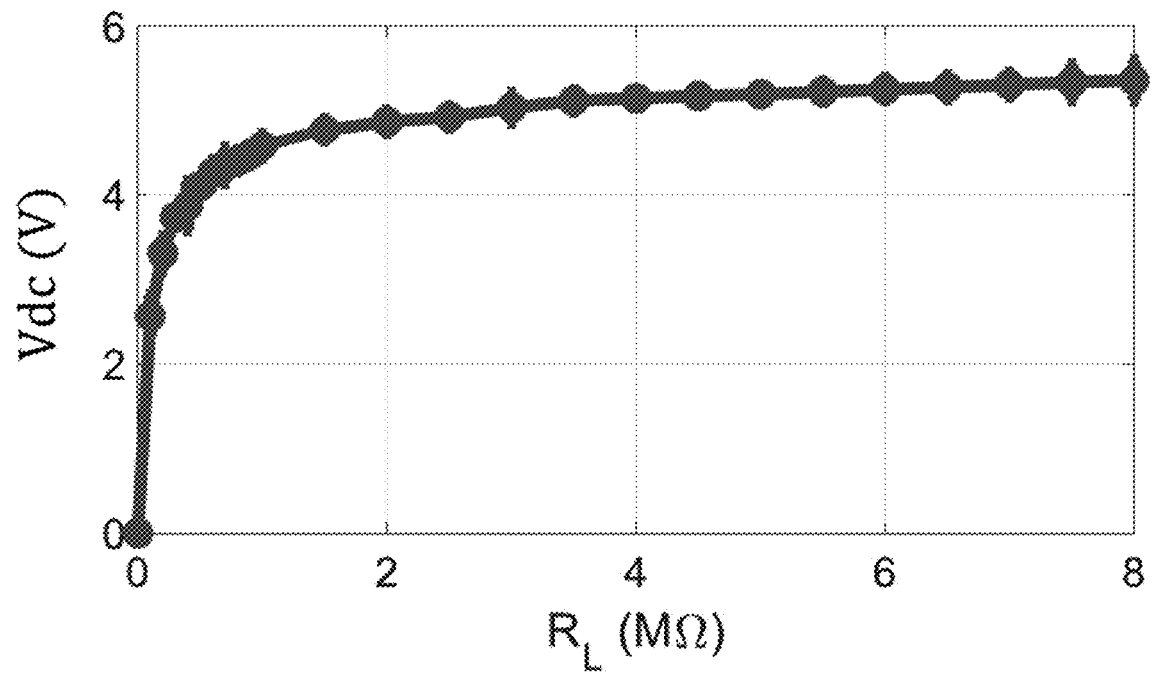
FIG. 7C is a graph of the measured voltage at the output of the harvester in FIG. 7A with an input frequency of 10 MHz.
Figure 7D:
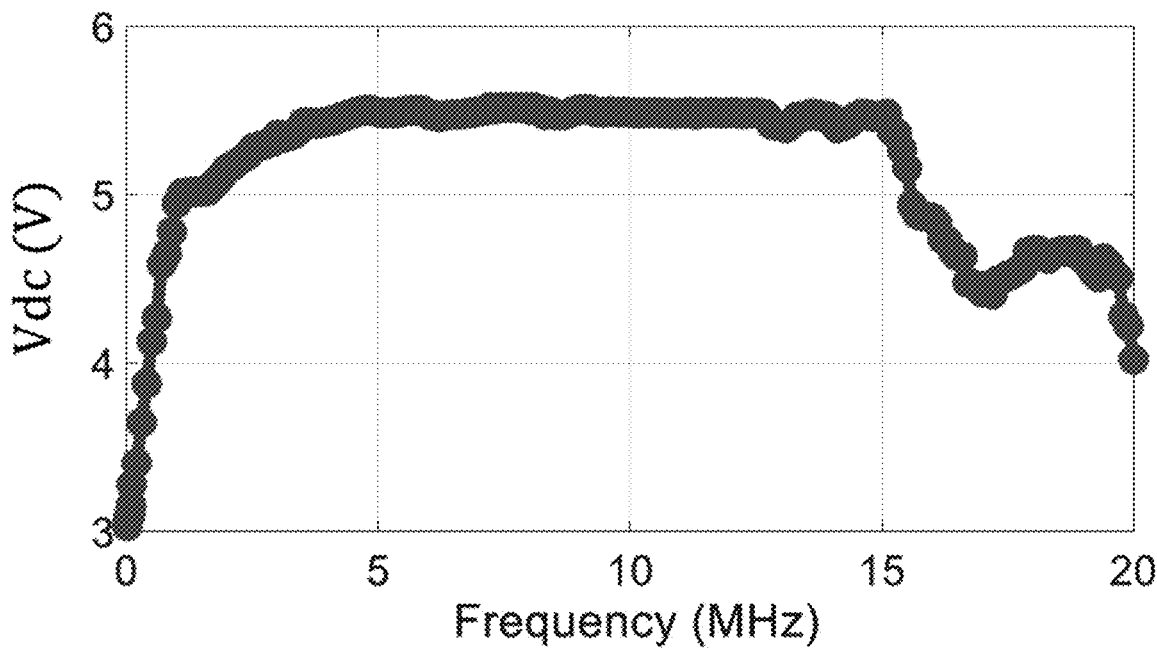
FIG. 7D is a graph of the broad-band response of the setup in FIG. 7A for a load $R_L$ of 1 MΩ.

FIG. 7C shows the measured voltage across different the load-resistance as the resistance value is varied. For this experiment the source voltage was programmed to 20 $V_{pk-pk}$ with an operating frequency of 10 MHz. Based on the plot in FIG. 7C, it can be estimated the delivered power to be approximately 45 μW. As described in Eqn. 5, the delivered power may be increased by increasing the size of the coupling capacitance or by increasing the size of the floating-electrode's self-capacitance. In another experiment, the voltage across the load $R_L$=1 MΩ was measured for different operating frequencies. The result is shown in FIG. 7D, which shows a broadband response within the frequency range of 1-15 MHz. This result can be understood using the equivalent circuit model shown in FIG. 6C. The input coupling capacitor $C_c$ blocks low-frequencies whereas the coupling capacitor $C_p$ bypasses high-frequencies to the load $R_L$. Also, at higher frequencies the substrate itself acts as an antenna and hence manifests as a radiation resistance in parallel with the load resistance $R_L$.

Figure 8A:
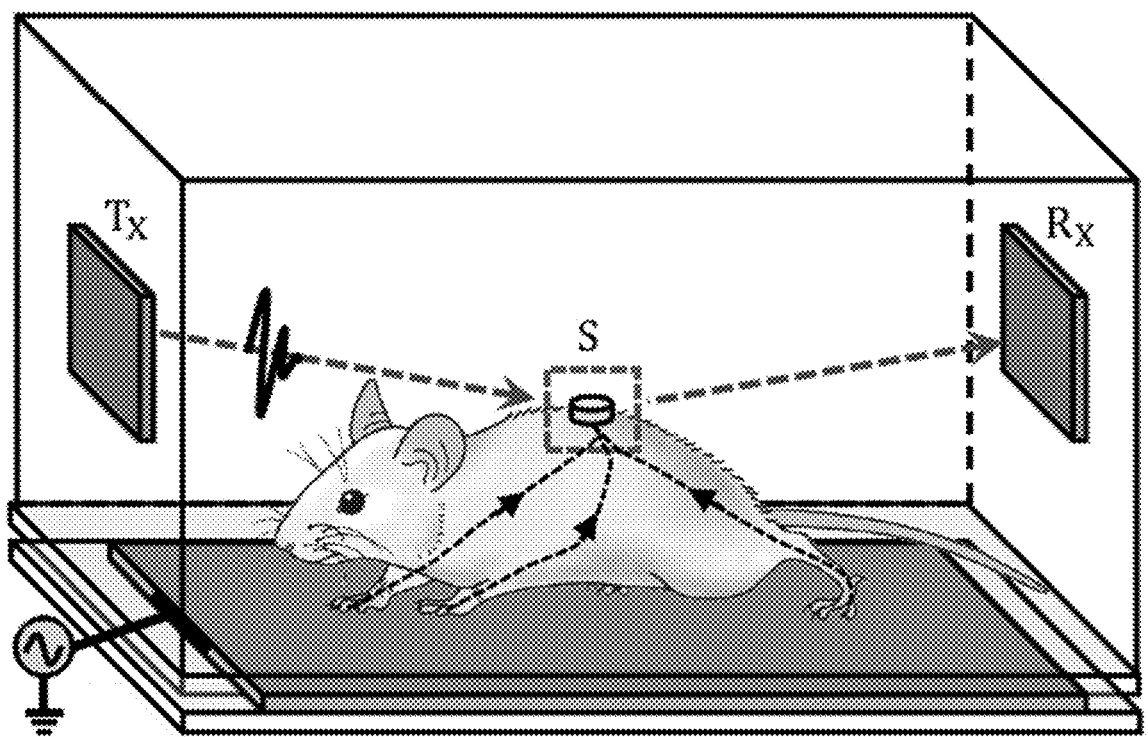
FIG. 8A is a diagram of an experimental hybrid telemetry setup.

SC-based WPT can be exploited for designing power-efficient animal cages for long-term and ambulatory monitoring applications. Previous designs of smart animal cages have used inductive coils embedded inside the flooring of the cage. Since the SC-based WPT operates by capacitively coupling an energy source through the body of the animal, the insulated base of the cage can be directly used as the coupling capacitor. This is shown in FIG. 8A, where power is coupled through different body segments as an animal is moving around in the cage. Note that the series resistance of a thick conductive underlay $R_s$ could be very small (on the order of 2.65*$10^{-8}$ Ω·m), which implies that the PTE according to Eqn. 4 may be close to 100%. Size limitations on the floating-electrode self-capacitance may limit power delivery to any ex-vivo part of the animal body to power levels on the order of microwatts. This limitation may be overcome by using a hybrid telemetry approach as shown in FIG. 8(a-c). The power harvested from the SC-based WPT approach is used to modulate the impedance of an RF antenna on the device S, in FIG. 8A. This modulation is then received as a backscattered RF signal emitted by the transmitter antenna $T_x$ and received by the receiver antenna $R_x$.

Figure 8B:
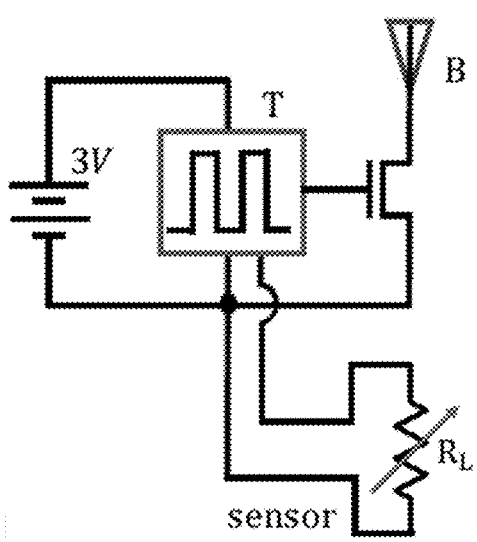
FIG. 8B is a schematic of a battery-based backscattering interface used as a control in the setup of FIG. 8A.
Figure 8C:
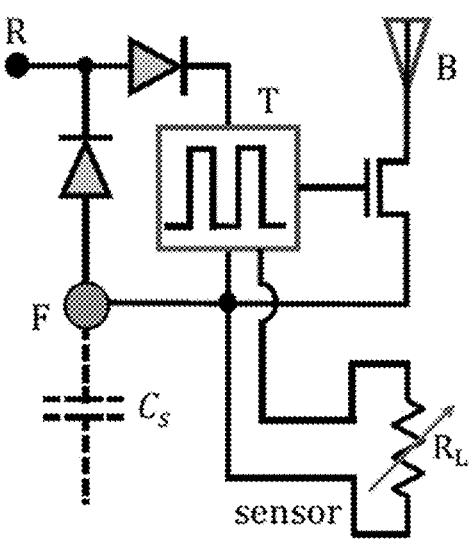
FIG. 8C is a schematic of a sensing/telemetry interface powered by self-capacitance based wireless power transfer in the setup of FIG. 8A.

This approach has previously been effectively used for backscattering Wi-Fi signals and for biotelemetry applications. Two examples of the biotelemetry interface are shown in FIGS. 8B and 8C. In both designs, a low-power oscillator T is used to switch the impedance of the antenna B. The frequency of the oscillator and hence the modulation frequency of the antenna is determined by a resistor $R_L$ whose value changes according to the sensor signal being sensed. Thus, the sensor signal is effectively backscattered on the signal received by the receiver $R_x$. FIG. 8B represents a battery powered variant of the telemetry interface and has been used for control experiments, whereas FIG. 8C represents the variant that is powered using SC-based WPT approach.

Figure 9A:
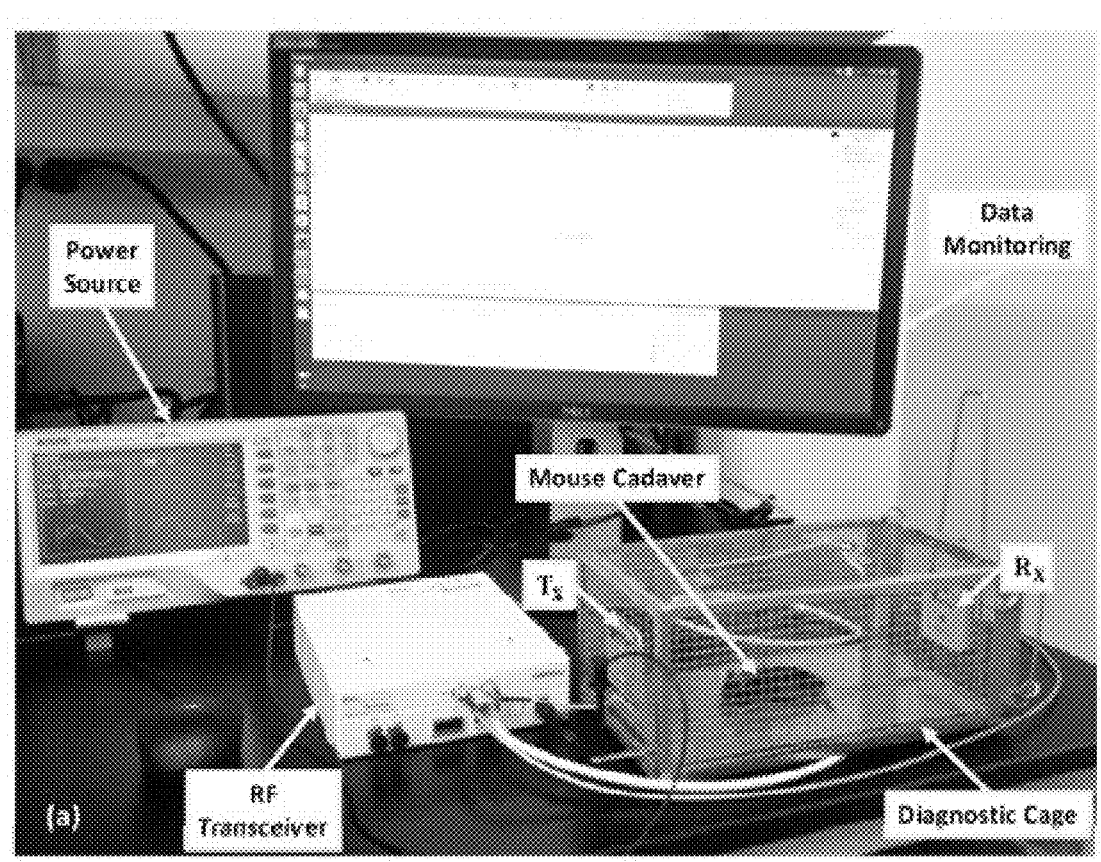
FIG. 9A is an experimental setup using a cadaver mouse housed in a diagnostic cage retrofitted with backscattering RF antennas.
Figure 9B:
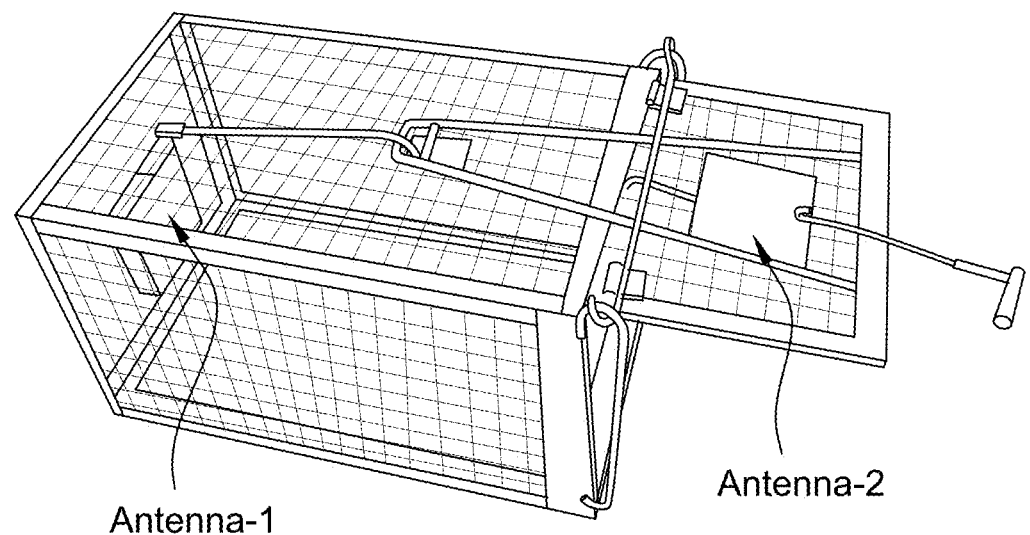
FIG. 9B is a picture of the wireless diagnostic cage of FIG. 9A.
Figure 9C:
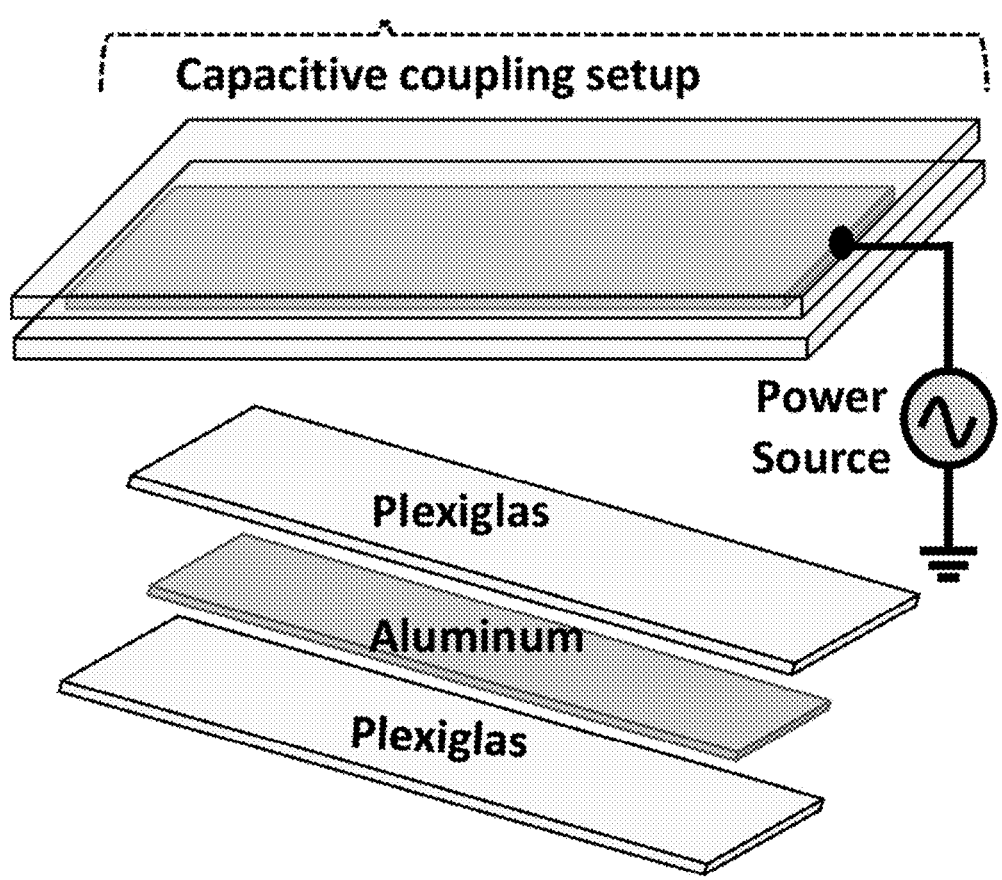
FIG. 9C is a schematic of the capacitive coupling setup for the cage of FIG. 9(b).

An apparatus used for the operation of a hybrid telemetry system is shown in FIG. 9A. A mouse cadaver is used to emulate the animal in a diagnostic cage. The bottom overlay of the cage, as shown in FIG. 9B is designed using an Aluminum sheet (6Ω) that is sandwiched between two Plexiglas insulators. The sheet is then connected to one of the outputs of a power source, as shown in FIG. 9C. Two 915 MHz ultra-high-frequency (UHF) antennas, Tx and Rx were used for backscattering. Both the antennas were controlled by a Software Defined Radio (Ettus Research USRP N210) and were programmed to transmit a carrier frequency and to receive the backscattered signal.

Figure 10A:
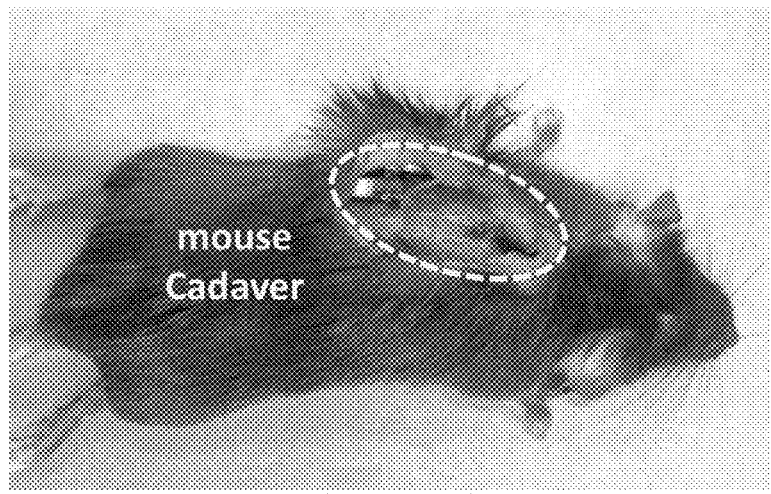
FIG. 10A is a photograph showing implantation of a temperature sensor in a cadaver mouse.
Figure 10B:
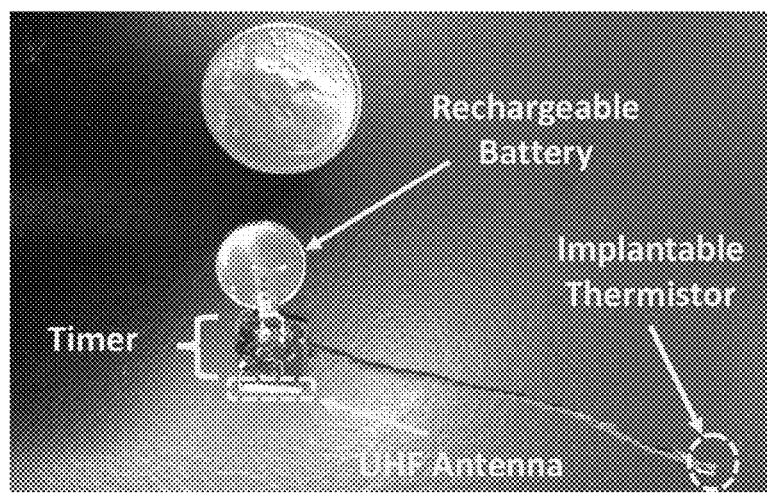
FIG. 10B is a battery-powered control prototype for implanting as in FIG. 10A.
Figure 10C:
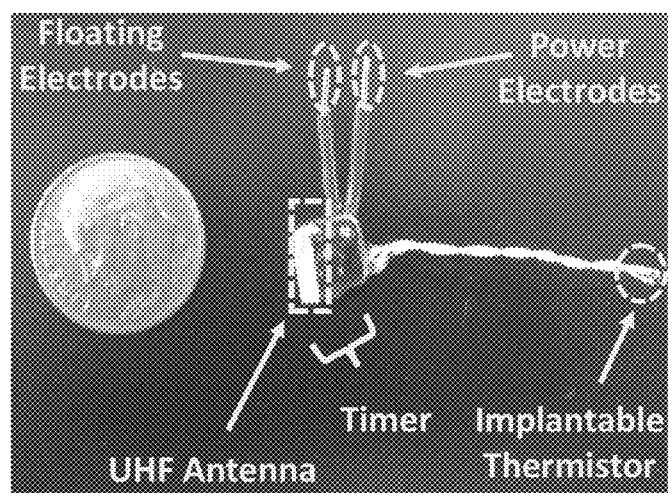
FIG. 10C is a self-capacitance based wireless power transfer powered prototype for implanting as in FIG. 10A.
Figure 11A:
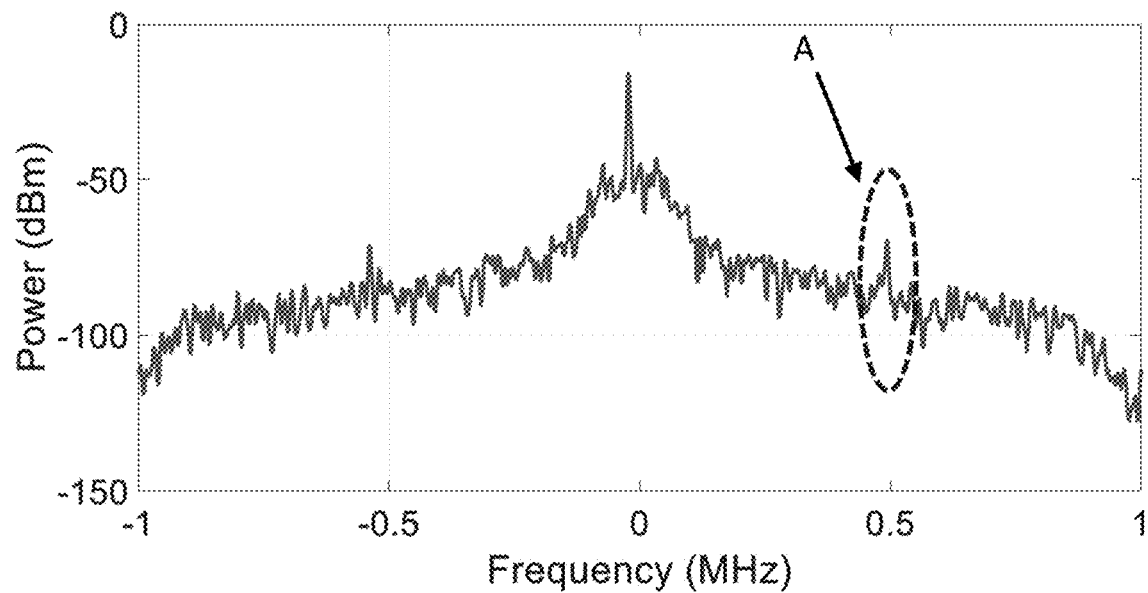
FIG. 11A is a graph of the spectrum of the backscattered signal received at $R_x$, when centered around the 915 MHz RF carrier for the prototype in FIG. 10C when implanted in the mouse cadaver as in FIG. 10A.
Figure 11B:
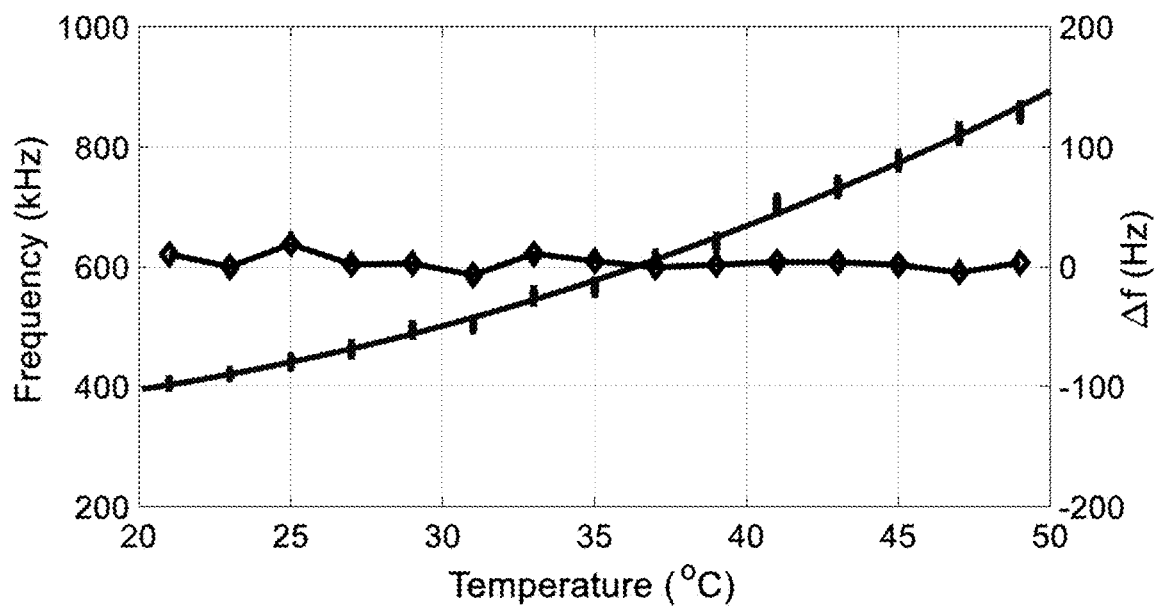
FIG. 11B is a graph of the change in the modulation frequency as a function of the temperature, measured using the SC-based implant of FIG. 10C.

The mouse cadaver is implanted with a device that can monitor variations in temperature at target locations in vivo and then backscattering the measurements to the receiver $R_x$. The surgical set up is shown in FIG. 10A and the surgical protocol is described in Example 2. The two types of implants (powered using a battery and powered using SC-based WPT) are shown in FIGS. 10B and 10C. The temperature sensor was implemented using a (NCP15WM474E03RC) thermistor whose temperature sensitivity is given by (5.1 kOhm/° C.). The tip of the thermistor was surgically implanted at a depth of 3 cm. The output of the thermistor was used to bias a TS3006 timer that implemented the backscatter according to the schematic described in FIG. 8. The backscatter was designed to operate on a single-supply voltage range between 1.55 V and 5.25 V with typical supply currents remaining below 2.4 μA. FIG. 11A shows the spectrum of the backscattered signal received at $R_x$, when centered around the 915 MHz RF carrier. To locally heat the tissue, another piece of wire was inserted in proximity to the area where the tip of the thermistor was located. Heat was applied to the other end of the wire externally which would lead to change in resistance at the output of the thermistor. This in turn would change the modulation frequency (labeled as A) in the received spectrum. FIG. 11B plots the change in the modulation frequency as a function of the temperature, measured using the SC-based implant. The result shows a monotonic response in the frequency shift with respect to temperature with less than 1% variance between the three trials. Thus, by measuring the frequency shift one could accurately infer the magnitude of the in vivo temperature. The average measured response is compared against the average response measured from the battery-powered implant. The result shows that the error between the two outputs Δf is negligible.

Table II shows the comparison of an exemplary self-capacitance based WPT with the most recent topologies in terms of efficiency, form factor and the distance of power delivery. From the table, it can be seen that the disclosed SC-based WPT has advantages compared with the efficiency, form factor and comparable power delivery distance for wearable electronics.

TABLE II

| REF | Modality | Form Factor | Distance | Efficiency | Misalignment Sensitivity | Method |
|---|---|---|---|---|---|---|
| [37] 2018 | Ind | $a_r$ = 40 mm × h = 115 mm | 70 mm | 70% | Yes | ex-vivo |
| [38] 2017 | Ind | $a_r$ = 50 mm | 120 mm | 72% | Yes | ex-vivo |
| [39] 2018 | Ind | $a_r$ = 33 mm | 6 mm | 58.6% | Yes | ex-vivo |
| [40] 2018 | Ind | 20 mm × 50 mm | N/A | 15.92% | Yes | ex-vivo |
| [41] 2016 | US | N/A | 7 mm | 25% | Yes | in-vivo |
| [42] 2015 | Rad | $a_r$ = 2 mm | 40 mm | 0.04% | Yes | in-vivo |
| [43] 2017 | Cap | $a_r$ = 60 mm | 7 mm | 66% | Yes | in-vivo |
| [44] 2018 | Cap | $a_r$ = 83 mm | 15 mm | 2.6% | Yes | in-vivo |
| This work | Cap | $a_r$ = 10 mm | 70 mm | 90% | No | ex-vivo |

A wireless power transfer method based on the intrinsic self-capacitances of substrates is disclosed. Compared to other WPT approaches, SC-based WPT demonstrates higher PTE, for example when the target power-budgets are in the order of microwatts. Also disclosed is a tractable, combined-parameter method for SC-based WPT that could be used for system optimization and comparison. This method has been validated using experimental results which demonstrate a broad-band response (1-15 MHz) for harvestable power budgets of 20-200 μW. Furthermore, SC-based WPT can demonstrate PTE ($\eta$>90%) for distances greater than 10 cm which makes it attractive for large-scale power delivery. The diagnostic cage, as shown in FIG. 9B could be scaled to larger dimensions, housing multiple ambulatory animals. Also, the power source is capacitively connected to the body, which will obviate the initiation of any electrochemical reactions at the electrode surface. Using the combined-parameter method, the maximum harvestable power for SC-based WPT scales linearly with the dimensions of the receiver transducer, and as a result, the size of the wearable or implant antenna may be reduced significantly. Note that the FDA limits on power dissipation for SC-based WPT are estimated to be 2.5 mW/mm$^2$ which is significantly higher than the microwatts power-budget described herein.

Thus the disclosed approach could be scaled to larger animals like human subjects through the use of wearables and under-the-skin implantables. There are several approaches to boost the power that can be delivered to the load using the disclosed SC-based WPT. Increasing the coupling capacitance $C_c$ in the equivalent model in FIG. 6C is one possible approach. However, this approach may require modifying the dielectric property of the substrate or the body. The power may be boosted by increasing the open-load voltage of the source as described by Eqn. 5. Note that this is viable option as long as the voltage is within the limits of the dielectric breakdown of the material forming $C_c$. Another option to boost the delivered power is to increase the size of the self-capacitance of the energy harvester $C_s$, described by the Eqn. 5. Note, however, that the received power scales linearly with the dimensions of the receiver transducer/antenna, and as a result may be best suited with a certain range of form-factors.

Self-capacitance $C_s$ is a parasitic element that will change based on the distribution of the fringe electric-field. However, given a specific form-factor $a_r$ and the shape of the floating-electrode, one could lower-bound the size of $C_s$ using a close-form expression as shown in Eqn. 2 for a spherical geometry. This therefore signifies the worst-case $C_s$ for which $R_L$ and minimum delivered power could be estimated. However, to further enhance the delivered power, a post-deployment calibration and adjustment of $R_L$ according to the actual self-capacitance value may be performed. Also self-capacitance may lead to an electrostatic charge build up due to floating-electrodes. However, note that the WPT method using 1 MHz-15 MHz AC and the DC potentials at the source and the remote device are decoupled from each other. So, the change in DC potential will not affect the WPT. In terms of safety, the self-capacitance of the floating-electrode is in the order pico-farads or less. Therefore, the charge build-up at the device may be relatively small. Safety related to electrostatic charge buildup on the body self-capacitance is similar to ESD safety. The method disclosed herein may apply to an ambulatory animal or a human body. The robustness of the self-capacitance based WPT is due in part to the fact that the efficiency degrades only linearly with distance (as shown in FIG. 4), so the approach is robust to ambulatory artifacts. A worst-case configuration would be when only the tail of the mouse is in contact with the floor and experimental setup in FIG. 7 verified the WPT for that configuration. Note that in all other ambulatory states, there will always be additional capacitive coupling path to the body (unless the animal is in the air). Also, any energy fluctuations due to motion artifacts may be filtered out by the energy regulation unit on the harvester.

EXAMPLES

The following non-limiting examples are provided to further illustrate the present disclosure. It should be appreciated by those of skill in the art that the techniques disclosed in the examples that follow represent approaches the inventors have found function well in the practice of the present disclosure, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the present disclosure.

Example 1: Derivation of PTE and Received Power for SC-Based WPT

For the circuit shown in FIG. 2 (*a*) denote:

$$Z_s = \frac{1}{j\omega C_s}$$

$$Z_b = \frac{1}{j\omega C_b}$$

$$Z_c = \frac{1}{j\omega C_c}$$

Then, $$V_o = V_s \frac{R_L}{R_L + Z_s} \frac{(R_L + Z_s) \| Z_b}{(R_L + Z_s) \| Z_b + (Z_c + R_s)} \quad (7)$$

$$= \frac{R_L Z_b V_s}{(Z_c + R_s)(R_L + Z_b + Z_s) + Z_b(R_L + Z_s)}$$

which leads to $$P_r = \frac{V_o^2}{R_L} = \frac{R_L V_s^2}{\left|\left(\frac{C_b}{C_a} + jR_s C_b \omega\right)\left(R_L - j\frac{C_s + C_b}{C_s C_b \omega}\right) + \left(R_L - j\frac{1}{C_s \omega}\right)\right|^2} = \quad (8)$$

$$\frac{R_L V_s^2}{\left(R_L\left(1 + \frac{C_b}{C_c}\right) + R_s\left(1 + \frac{C_b}{C_s}\right)\right)^2 + \left(R_L R_s C_b \omega - \frac{C_c + C_b + C_s}{C_c C_s \omega}\right)^2}$$

$$Z_{in} = (Z_c + R_s) + \frac{Z_b(R_L + Z_s)}{(R_L + Z_b + Z_s)} \quad (9)$$

$$P_s = \frac{V_s^2}{|Z_{in}|} = \frac{V_s^2}{\left|(Z_c + R_s) + \frac{Z_b(R_L + Z_s)}{(R_L + Z_b + Z_s)}\right|} = \quad (10)$$

$$\frac{V_s^2\left[R_L + R_L^2 R_s(C_b \omega)^2 + R_s\left(1 + \frac{C_b}{C_s}\right)^2\right]}{\left(R_L\left(1 + \frac{C_b}{C_c}\right) + R_s\left(1 + \frac{C_b}{C_s}\right)\right)^2 + \left(R_L R_s C_b \omega - \frac{C_c + C_b + C_s}{C_c C_s \omega}\right)^2}$$

The PTE ($\eta$) can then be estimated according to equation 1 as $$\eta = \frac{R_L}{R_L + R_L^2 R_s (C_b \omega)^2 + R_s \left(1 + \frac{C_b}{C_s}\right)^2} \quad (11)$$

$$\eta = \frac{1}{1 + R_L R_s (4\pi^2 \epsilon_0 f d)^2 + \frac{R_s}{R_L}\left(1 + \frac{d}{2a_r}\right)^2}$$

The PTE can be maximized with respect to $R_L$ by setting:

$$\frac{\partial \eta}{\partial R_L} = 0, R_L \approx \frac{1}{8\pi^2 \epsilon_0 f a_r} = \frac{1}{C_s \omega}$$

which leads to $$\eta_{max} = \frac{1}{1 + 8\pi^2 \epsilon_0 f R_s \left(a_r + d + \frac{d^2}{2a_r}\right)} \quad (12)$$

Example 2: Cadaver Material and Methods

As a proof of concept, experiments have been conducted on the mouse cadaver. Mouse cadavers were selected because they are easy to work with, and the cadavers accurately model the electrical characteristics of a live animal, provided they have been stored and revived properly. Since a live animal and a cadaver will both have capacitive coupling to the floor of the mouse cage, the WPT mechanism generally operates for both live animals and cadavers.

In one experiment, a battery-based electronic circuit was surgically implanted subcutaneously within the mouse cadaver. The battery and circuit were placed subcutaneously along the dorsum of the back. A thermistor was implanted underneath the interscapular adipose tissue. The incision was closed with glue to prevent exposing the implant in order to perform the measurements. The measured temperature data of the mouse tissue was used as a reference for a second experiment in which the battery-less wearable electronic circuit that harvests the energy through the self-capacitance methods described herein was implemented. Three mouse cadavers were used to statistically verify results and compare with the reference data. There was no direct contact between the mouse cadaver and the electric power source, but instead an insulated wire was wrapped around the mouse tail to form a coupling capacitor.

Definitions and methods described herein are provided to better define the present disclosure and to guide those of ordinary skill in the art in the practice of the present disclosure. Unless otherwise noted, terms are to be understood according to conventional usage by those of ordinary skill in the relevant art.

In some embodiments, numbers expressing quantities of ingredients, measurements, properties such as molecular weight, reaction conditions, and so forth, used to describe and claim certain embodiments of the present disclosure are to be understood as being modified in some instances by the term "about." In some embodiments, the term "about" is used to indicate that a value includes the standard deviation of the mean for the device or method being employed to determine the value. In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable. The numerical values presented in some embodiments of the present disclosure may contain certain errors necessarily resulting from the standard deviation found in their respective testing measurements. The recitation of ranges of values herein is merely intended to serve as a shorthand method of referring individually to each separate value falling within the range. Unless otherwise indicated herein, each individual value is incorporated into the specification as if it were individually recited herein.

In some embodiments, the terms "a" and "an" and "the" and similar references used in the context of describing a particular embodiment (especially in the context of certain of the following claims) can be construed to cover both the singular and the plural, unless specifically noted otherwise. In some embodiments, the term "or" as used herein, including the claims, is used to mean "and/or" unless explicitly indicated to refer to alternatives only or the alternatives are mutually exclusive.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

All publications, patents, patent applications, and other references cited in this application are incorporated herein by reference in their entirety for all purposes to the same extent as if each individual publication, patent, patent application or other reference was specifically and individually indicated to be incorporated by reference in its entirety for all purposes. Citation of a reference herein shall not be construed as an admission that such is prior art to the present disclosure.

Having described the present disclosure in detail, it will be apparent that modifications, variations, and equivalent embodiments are possible without departing the scope of the present disclosure defined in the appended claims. Furthermore, it should be appreciated that all examples in the present disclosure are provided as non-limiting examples. As various changes could be made in the above constructions and methods without departing from the scope of the disclosure, it is intended that all matter contained in the above description and shown in the accompanying drawing(s) shall be interpreted as illustrative and not in a limiting sense.

What is claimed is:

1. A self-capacitance based remote power delivery device comprising:
  a modulating power source electrically coupled to a grounded substrate, the modulating power source configured to be capacitively coupled to a self-capacitive body;
  an energy harvesting device coupled to the grounded substrate, the energy harvesting device configured to be capacitively coupled to the self-capacitive body; and
  the substrate, wherein the substrate is configured to be capacitively coupled to a portion of the self-capacitive body in direct contact with the substrate.

2. A self-capacitance based method of remotely delivering power, the method comprising:
  coupling a modulating power source and an energy harvesting device to a grounded substrate;
  capacitively coupling the modulating power source and the energy harvesting device to a self-capacitive body;
  capacitively coupling the grounded substrate to a portion of the self-capacitive body in contact with the grounded substrate; and
  operating the modulating power source at an operating frequency to deliver power to the energy harvesting device via the self-capacitive body.

3. A self-capacitance based biotelemetry system comprising:
  a grounded substrate comprising an insulating layer and a conductive layer, wherein the conductive layer is coupled to a power source, and the grounded substrate is configured to be capacitively coupled to a portion of a self-capacitive body in contact with the grounded substrate;
  a transmitter antenna;
  a receiver antenna; and
  a biotelemetry interface device capacitively coupled to the self-capacitive body, the biotelemetry interface device comprising:
  a low-power oscillator;
  a radio frequency antenna;
  a resistor;
  a rectifying diode bridge; and
  a floating electrode coupled to a reference terminal.

* * * * *